United States Patent
Melin

[15] 3,646,318
[45] Feb. 29, 1972

[54] APPARATUS FOR CONTROLLING THE TEMPERATURE OF A SAMPLE DURING THE EXAMINATION THEREOF

[72] Inventor: Karl-Axel Melin, Asarum, Sweden
[73] Assignee: Incentive Research & Development AB, Bromma, Sweden
[22] Filed: May 27, 1969
[21] Appl. No.: 828,299

[30] Foreign Application Priority Data

May 29, 1968    Sweden..................................7214/68

[52] U.S. Cl...............................219/300, 219/209, 219/499
[51] Int. Cl..............................................................H05b 3/40
[58] Field of Search.........................219/209, 210, 300, 499

[56] References Cited

UNITED STATES PATENTS

| | | | |
|---|---|---|---|
| 2,097,868 | 11/1937 | Beard | 219/209 X |
| 2,287,974 | 6/1942 | Cohen | 219/300 X |
| 2,604,267 | 7/1952 | Smith | 219/499 X |
| 2,761,052 | 8/1956 | Knudson | 219/499 |

Primary Examiner—R. F. Staubly
Attorney—Karl W. Flocks

[57] ABSTRACT

A sample during its examination in the chamber of an X-ray diffraction camera comprising a chamber body mounted in the X-ray diffraction camera to traverse the X-ray axis in the camera, a passage extending through the chamber body coaxially with the X-ray axis of the camera, a nozzle in the chamber body discharging into the passage between the ends thereof and transversely of the X-ray axis of the camera, a bore in the chamber body merging and sample into the passage with the sample to be held in the X-ray axis of the camera and in front of the nozzle, a source of pressurized gas, a tube having an electrically conductive wall connected at one end to the source of gas and at the other end to the nozzle, current control means connected to the ends of the tube for feeding an electric current through the wall of the tube to heat the tube and the gas passing therethrough, and an electric temperature sensor mounted in the passage of the chamber body adjacent the X-ray axis of the camera and in front of the nozzle and being connected to the current control means for governing the magnitude of electric current through the wall of the tube. A gas cooler is connected in series between the source of pressurized gas and the tube.

2 Claims, 3 Drawing Figures

APPARATUS FOR CONTROLLING THE TEMPERATURE OF A SAMPLE DURING THE EXAMINATION THEREOF

It is frequently desired that one should be able to control the temperature of a sample during its examination in a chamber, when it may be necessary to maintain the temperature of the sample carefully constant or to change said temperature at a given, usually low and carefully determined rate, for instance during examination of the crystallization phenomena in a fat sample in the form of a small fat droplet disposed on a holder in a chamber, by transmitting an X-ray through the sample and photographing the resulting X-ray diffraction pattern.

To this end, the present invention suggests a temperature control method which comprises passing into the chamber a gas stream through a tube having an electrically conductive wall, and controlling the temperature of said gas stream by causing an electric temperature sensor provided in said chamber to control, in response to its temperature and thus the temperature of the sample, the magnitude of an electric current through the tube wall serving as the heating element, for heating the gas stream passing through said tube.

The invention also relates to an apparatus for carrying this method into effect, in which the sample to be examined is disposed in a chamber having an inlet and an outlet for gas, and this apparatus is essentially characterized in that a source of pressure gas is connected via a tube having an electrically conductive wall to the inlet of the chamber for injecting a gas stream into said chamber, that said tube wall is connected in an electric circuit comprising current control means, and that an electric temperature sensor is disposed in said chamber and connected to said current control means for controlling the magnitude of the electric current through the tube wall.

By the present invention, a very exact temperature control is made possible with simple means.

As the invention was made in connection with the recording of X-ray diffraction patterns of fat samples, it will be described in the following with reference to this particular case, but obviously the invention is applicable also to other, more or less similar cases.

Figure 1:
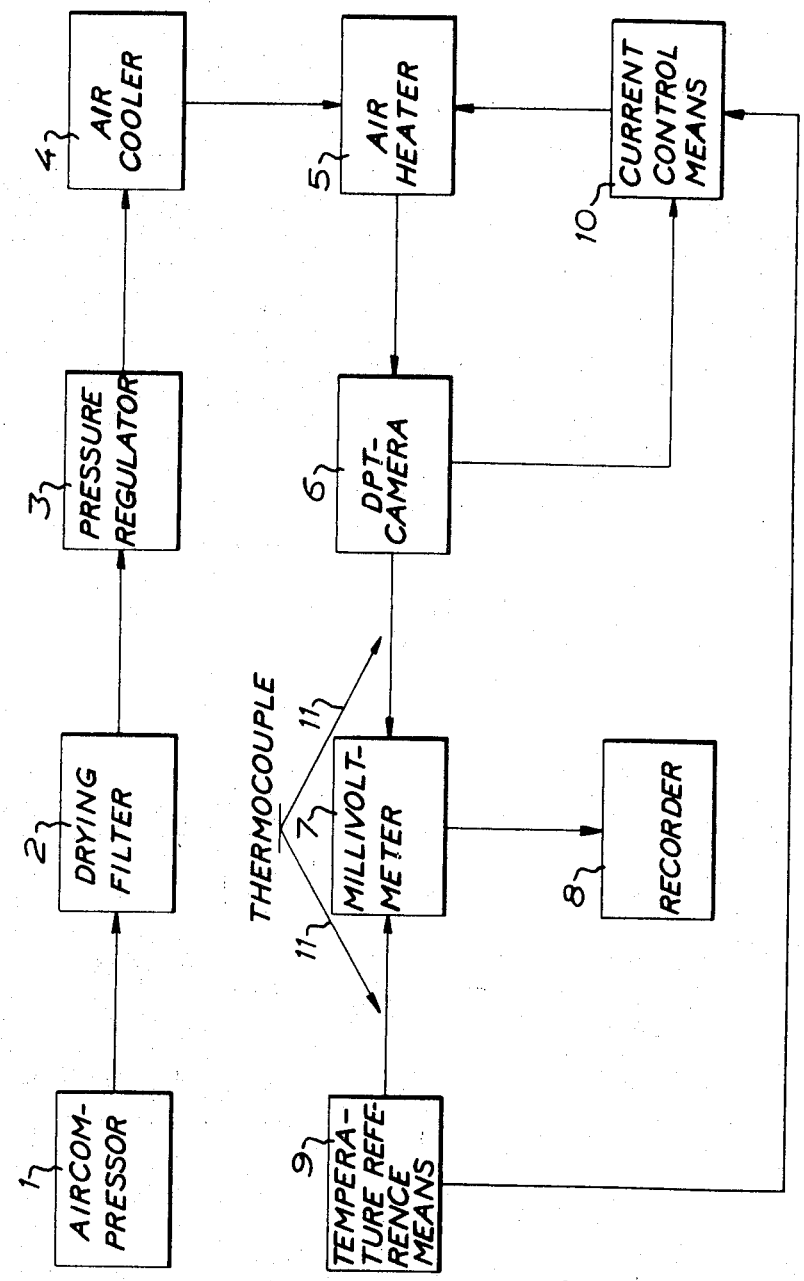
FIG. 1 illustrates a block diagram of an apparatus for photographing X-ray diffraction patterns under carefully determined temperature conditions of a fat sample.

FIG. 1 shows an air compressor 1 capable of delivering air at a pressure of 5–7 kg. per sq.cm. The compressed air from the compressor is passed to a drying filter 2 of known construction where the air is dried and filtered, whereupon it is passed to a pressure regulator 3 delivering the air at a controllable constant pressure within the range of 2–4 kg. per sq.cm. to an air cooler 4. This air cooler which may be a copper tube coil immersed in a mixture of solid carbon dioxide and ethanol cools the air to e.g., −70° C. From the cooler 4, the air passes through an air heater 5 which will be described in more detail in the following and which heats the compressed air by means of an electric current from a current control means 10 and passes it to a sample chamber in an X-ray diffraction camera 6. Arrows 11 designate an electric temperature sensor in the form of a thermocouple, one junction of which is located in the sample chamber of the camera, while the other junction of said thermocouple is located in a temperature reference means 9 to be maintained at a constant temperature, for instance 0.0° C., when the means 9 can be a bath of melting ice. The two terminals of the thermocouple 11 are connected on one hand to the current control means 10 for controlling the magnitude of the electric current to the air heater 5 and thus controlling the heating of the air passing through the air heater 5 and, on the other hand, to a millivoltmeter 7 which is connected to a recorder 8.

Figure 2:
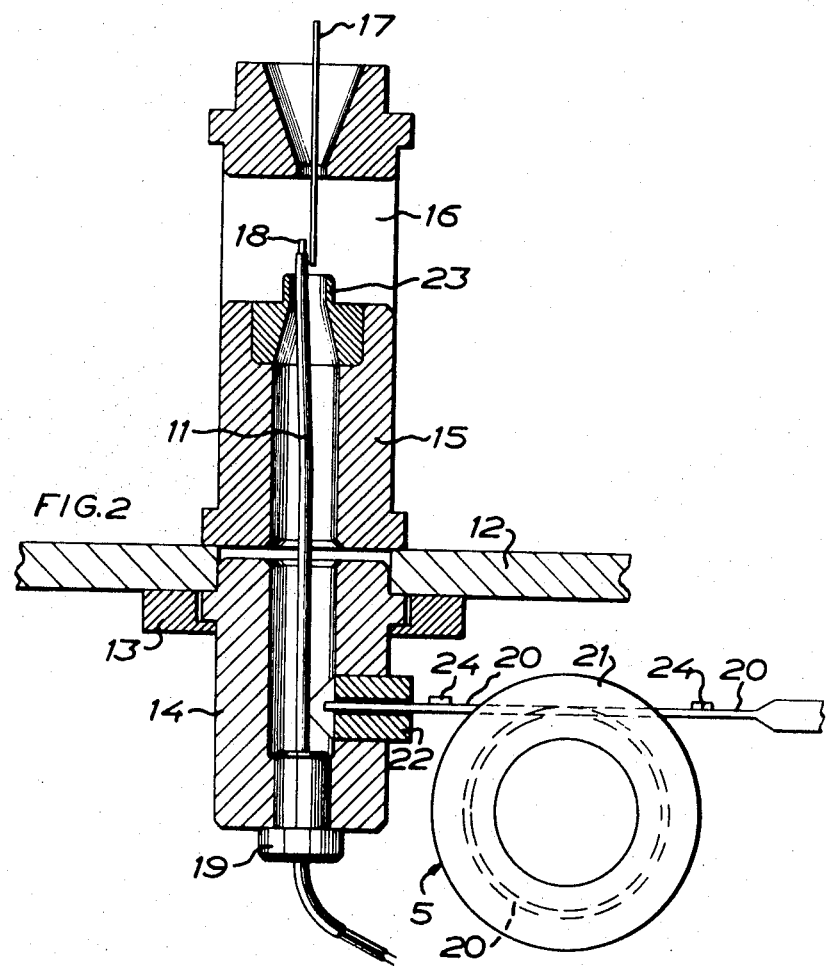
FIG. 2 is a vertical section of a sample chamber included in an X-ray diffraction camera and shows some of the details of the apparatus according to the invention.

FIG. 2 illustrates the sample chamber in the X-ray diffraction camera (FIG. 1) which is of per se known construction. An opening is provided in a horizontal partition 12 in the camera. To the underside of the wall there is clamped by means of a ring 13 a lower sleeve 14 projecting into the wall opening, and to the upper side of said wall there is clamped, in a manner not shown, an upper sleeve 15 coaxial with said lower sleeve. The upper sleeve has a transverse bore 16 which constitutes the sample chamber proper. A holder 17 for carrying a sample, for instance a fat droplet, projects centrally into the chamber 16 through the upper end of the sleeve 15 so that the sample is struck by an X-ray coming from a source of radiation (not shown) and entering the chamber or the transverse bore 16 along the axis thereof from the left in FIG. 2. The X-ray is subjected to diffraction in the sample, and the resulting diffraction pattern is photographed on a photographic film or plate (not shown) located to the right of the chamber 16 in FIG. 2. One junction 18 of the thermocouple 11 is located in the chamber 16 immediately adjacent the sample but naturally laterally of the X-ray path, and the thermocouple extends downwardly through the sleeves 14 and 15 and through a holder 19 in the lower end of the sleeve 14 to the temperature reference means 9 not shown in FIG. 2.

To accomplish rapid temperature control, the air heater 5 is disposed adjacent the sleeve 14, as is shown in FIG. 2. The air heater comprises a 500 mm. long tube 20 of stainless steel formed into a coil and having an internal diameter of 1.4 mm. and an outer diameter of 2.0 mm. The coil is surrounded by a heat insulating jacket 21 of glass-fiber fabric. One end of the tube 20 is connected to the air cooler 4 (FIG. 1), and the other tube end extends into the cavity of the sleeve 14 through a connecting means 22 secured in an opening in the wall of the sleeve 14. To make it possible for the air injected through the tube 20 into the cavities of the sleeves 14 and 15 to influence as quickly as possible the temperature of the sample disposed in the chamber 16, the sleeve 15 has a nozzle 23 directing the air entering the chamber 16 onto the sample provided on the holder 17. The air then escapes from the chamber 16 through outlet openings therein. In FIG. 2, connecting means 24 are indicated schematically for connecting the wall of the tube 20 in an electric circuit comprising the current control means 10 (FIG. 1) so that the tube wall will serve as an electric resistance element for heating the airstream through the tube 20.

Figure 3:
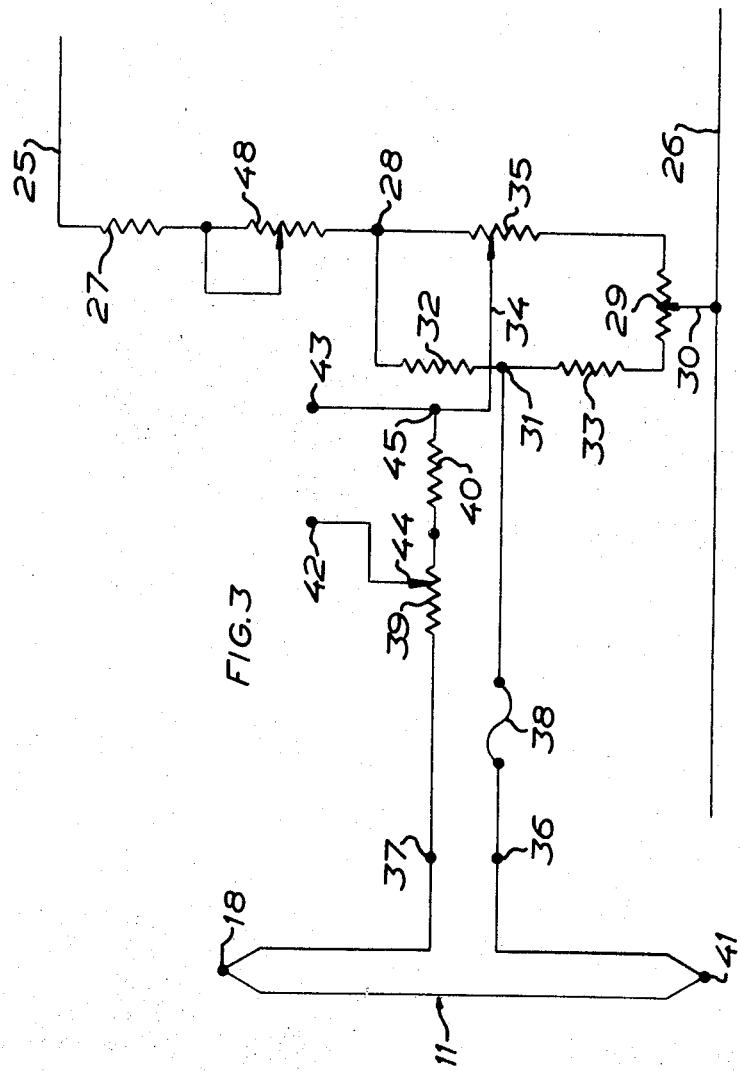
FIG. 3 shows an electric circuit diagram.

FIG. 3 shows that part of the current control means 10 according to FIG. 1 which is of interest to the invention, as well as the thermocouple 11. Two lines 25 and 26 are connected to a current source (not shown). Via a resistor 27 and a controllable resistor 48 for calibration purposes, the line 25 is connected to a terminal 28 of a measuring bridge, and the line 26 is connected to the movable contact 30 of a potentiometer 29, said contact forming a second terminal of the measuring bridge and serving for zeroizing. A terminal 31 of a bridge diagonal is connected to the terminal 28 by means of a stationary resistor 32 and is connected to the other end of said potentiometer 29 by means of a stationary resistor 33. The other terminal of the bridge diagonal is formed by a movable contact 34 of a potentiometer 35, the ends of which are connected respectively to the terminal 28 and to the other end of the potentiometer 29. The bridge diagonal comprises two terminals 36 and 37. The terminal 36 is connected to the terminal 31 via a fuse 38, and the terminal 37 is connected to the movable contact 34 of the potentiometer 35 via a potentiometer 39 and a stationary resistor 40 connected in series with said potentiometer 39. Connected to the terminals 36 and 37 are the thermocouple 11 with the junction 18 disposed in the sample chamber and the junction 41 disposed in the temperature reference means 9 (FIG. 1). The millivoltmeter 7 which is shown in FIG. 1 but not in FIG. 3 is also connected to the terminals 36 and 37. Two output signal terminals 42 and 43 are provided for deriving an output control signal from the bridge terminal. The terminal 42 is connected with the movable contact 44 of the potentiometer 39, and the terminal 43 is connected to that end 45 of the resistor 40 which is connected with the movable contact 34 of the potentiometer 35.

With the movable contact 34 of the potentiometer 35, the desired temperature difference between the two junctions 18 and 41 of the thermocouple 11 and thus also the desired temperature of the sample in the sample chamber can be set. When the desired temperature difference has been established between the junctions 18 and 41, a current of a certain magnitude flows through the bridge diagonal. This current causes a certain voltage drop across the potentiometer 39 and the resistor 40, and part thereof occurs as a control output signal between the terminals 42 and 43. This control signal controls in a known manner a current supply means (not shown) passing a current of suitable magnitude through the resistance element which is constituted by the wall of the tube 20 (FIG. 2) for heating the airstream in the tube to a suitable temperature for maintaining the sample at the temperature set. Should the sample temperature decrease below the temperature set by means of the potentiometer 35, the thermocouple 11 changes the current flowing through the bridge diagonal in such a way that the control output signal across the terminals 42 and 43 causes the current supply means to increase the current through the wall of the resistance element tube 20 so that the air will be heated more and the temperature of the sample increases. If the sample temperature increases beyond the temperature set, the thermocouple changes the current through the bridge diagonal so that the control signal reduces the current through the wall of the resistance element tube 20 so that the airstream through the tube will be heated less and the sample reduces its temperature. In this way, the temperature of the sample can be maintained within very narrow limits substantially at the temperature set by means of the potentiometer 34, 35.

It is also possible to change the temperature of the sample during the course of the examination in accordance with a predetermined program by causing a per se known programmer to reset the movable contact 34 of the potentiometer 35 by means of a motor. In am embodiment comprising the programmer, the apparatus according to the present invention has been found capable of heating or cooling the sample with great exactitude and with a desired constant rate of between 0.05° and 2.5° C. per minute within a temperature range of e.g., −50° C. and 100° C.

What I claim and desire to secure by Letters Patent is:

1. A sample chamber apparatus for an X-ray diffraction camera for examination of crystallization phenomena in a sample comprising a sample chamber body mounted in the X-ray diffraction camera so as to traverse the X-ray axis in the camera, means defining a passage through said sample chamber body coaxially with the X-ray axis of the camera, nozzle means in said sample chamber body discharging into the passage between the ends thereof and transversely of the X-ray axis of the camera, means defining a bore in said sample chamber body merging into the passage for introducing a sample holder into the passage for holding a sample in the X-ray axis of the camera in the passage and in front of said nozzle means, a source of pressurized gas, a tube having an electrically conductive wall, one end of said tube being connected to said source and the other end of said tube being connected to said nozzle means, current control means connected to the ends of said tube for feeding an electric current through the wall of said tube for heating the wall of said tube and thereby heating the gas passing through said tube, an electric temperature sensor mounted in the passage of said sample chamber body adjacent the X-ray axis of the camera and in front of said nozzle means and being connected to said current control means for governing the magnitude of the electric current through the wall of said tube.

2. A sample chamber apparatus according to claim 1, comprising a gas cooler connected in series between said source of pressurized gas and said tube.

* * * * *